Sept. 2, 1952     H. M. EVANS     2,609,121

PUNCTURING DISPENSER FOR CANNED LIQUIDS

Filed July 14, 1950

Harry M. Evans
INVENTOR.

Patented Sept. 2, 1952

2,609,121

UNITED STATES PATENT OFFICE 2,609,121

PUNCTURING DISPENSER FOR CANNED LIQUIDS

Harry M. Evans, Graham Township, Clearfield County, Pa.

Application July 14, 1950, Serial No. 173,823

1 Claim. (Cl. 222—83.5)

1

The present invention relates to a simple and practical attachment for canned liquids, particularly cans which are used to market evaporated milk and the like and the general purpose of the invention is to provide a readily applicable and removable attachment which serves to puncture the can, to provide a handle for holding the punctured can and, in addition, to provide a pouring spout to expedite the flow of milk by way of the pouring spout.

Needless to say, the prior art to which the invention relates reveals many and varied styles and forms of milk can attachments. In carrying out the principles of the instant invention, an attachment has been devised which is unique in that manufacturers and users will find their essential needs fully met, contained and effectually available therein.

Novelty is predicated on a simple, practical and economical can attachment which may be fashioned from flat strap metal or equivalent material, the over-all device comprising a stirrup in which the milk can is saddled and held, said stirrup being provided on one side with a convenient hand grip, an opposite side carrying a lever and said lever having a can puncturing prong and, in addition, a can puncturing and pouring spout.

Other objects and advantages will become more readily apparent from the following description and the accompanying illustrative drawings.

Figure 1:
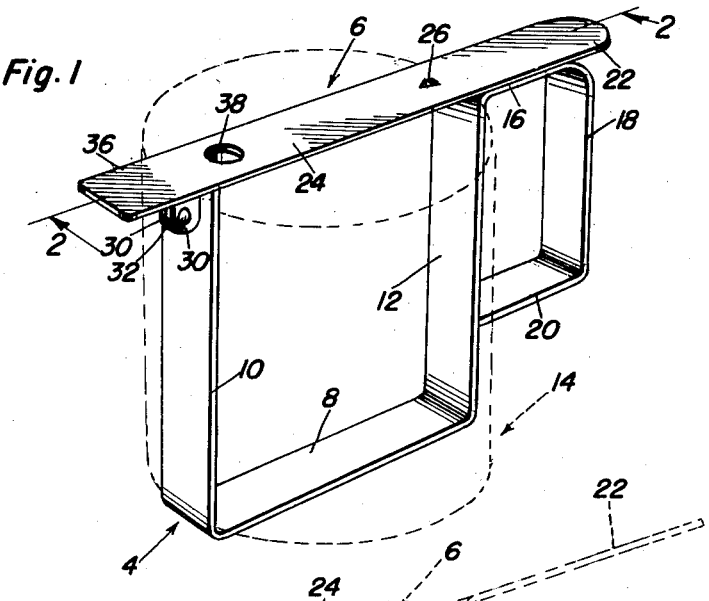
Figure 1 is a perspective view of a can attachment constructed in accordance with the principles of the invention and showing the manner in which the attachment is applied and used.
Figure 2:
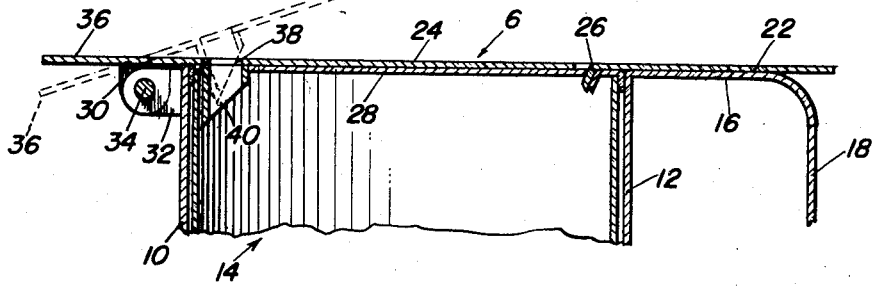
Figure 2 is an enlarged fragmentary sectional view taken approximately on the plane of the line 2—2 of Figure 1, looking in the direction of the arrows; and, Figure 3 is an end view fragmentary in type observing the structure in a direction from left to right.
Figure 3:
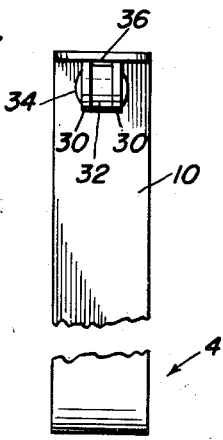

Referring now to the drawings by reference numerals and lead lines, it will be seen that the attachment is characterized essentially by two complemental units; namely the can embracing and holding unit 4 and the lever unit 6. The first named unit is of flat strap metal essentially in the form of a U-shaped stirrup. It includes a bottom or bight portion 8 and a pair of spaced vertical limbs 10 and 12. Thus, the evaporated milk can 14 may be conveniently saddled and held in place in the stirrup. The upper end of the limb 12 is laterally directed as at 16 and then bent laterally down at 18 and laterally in at 20 to provide an appropriate hand grip. The portion 16 also serves as a rest for the coacting free end portion 22 of the lever. The lever proper is denoted by the numeral 24 and this is in the form of a flat strip of metal having a puncturing prong 26 which is struck out and adapted to press an opening or hole in the top 28 of the can 13 as best shown in Figure 2. The opposite end portion of the lever is provided with a pair of spaced parallel attaching and assembling ears 30—30 and these ears straddle a lug 32 which is carried by the upper end of the limb 10, said ears being hinged to said lug by pivot pin 34. The adjacent end portion 36 of the lever overlies and projects beyond the hinge means and provides a flat pouring lip or tongue. There is a pouring hole 38 formed in the lever inwardly of the hinge and a pointed cutting spout 40 is attached to the under side of the lever and lines up with the hole 38. It follows that by pressing the lever from the dotted line position in Figure 2 down to the full line position shown in the same figure, the pouring spout 40 punctures and passes through an opening in the can. The prong 26 also, in due order, punctures the can. The last named puncture is primarily that which functions as a vent and facilitates free pouring of the milk contents of the can through the spout 40 and hole 38. Since the liquid is fairly heavy, it will spill slowly onto the tongue 36 and the latter may be used as a sort of a spatula in feeding the liquid contents from the can into a tea cup or other receptacle.

In practice, the lever is opened fully and the can is fitted removably into the U-shaped saddle. Then when the lever is swung back to the full line position shown in the drawings, it combines with the saddle in forming a can enclosing frame. The can fitting into the frame is maintained securely in place and the contents may be easily poured out and dispensed in an obvious fashion. The attachment may be used over and over, is sturdy, easy to apply and remove, and will aptly fulfill the requirements of manufacturers and users alike.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

A can attachment of the class described comprising a length of flat strap metal bent intermediate its ends to provide a U-shaped stirrup, said stirrup being adapted to receive and substantially embrace a milk can or the like, said stirrup embodying a bight portion and a pair of spaced parallel limb portions, the one end of one limb portion being bent laterally in a direction away from said limb portion, being bent laterally into spaced parallelism with said limb portion and finally being bent laterally in toward and engaging said one limb portion and said several bends cooperating in providing a hand-grip, the other end of the other limb portion being provided with an outstanding lug, a flat lever spanning the open end portion of said stirrup and having one end portion provided with ears straddling and hingedly connected to said lug, said one end portion having a pouring hole and a complemental aligned pouring spout, said one end portion projecting beyond said other limb portion and ears and providing a pouring lip for coaction with said pouring hole and spout, the opposite end of said lever resting directly on the first-named lateral bend of said hand grip and being provided with a struck out tongue providing a can puncturing prong.

HARRY M. EVANS.

REFERENCES CITED

The following references are of record in the file of this patent:

UNITED STATES PATENTS

| Number | Name | Date |
|---|---|---|
| 1,013,750 | Doredant | Jan. 2, 1912 |
| 1,221,724 | Haack et al. | Apr. 3, 1917 |
| 1,380,662 | Levi | June 7, 1921 |
| 1,426,180 | Gottredsen | Aug. 15, 1922 |
| 2,228,536 | Scalph | Jan. 14, 1941 |